US008503400B2

(12) United States Patent
Park et al.

(10) Patent No.: US 8,503,400 B2
(45) Date of Patent: Aug. 6, 2013

(54) SYSTEMS AND METHODS FOR CLOSED SUBSCRIBER GROUP CELL RESELECTION

(75) Inventors: Kenneth J. Park, Cathlamet, WA (US); Sayantan Choudhury, Vancouver, WA (US); Ahmad Khoshnevis, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 889 days.

(21) Appl. No.: 12/233,516

(22) Filed: Sep. 18, 2008

(65) Prior Publication Data

US 2010/0067491 A1 Mar. 18, 2010

(51) Int. Cl.
*H04W 36/00* (2009.01)
*H04W 36/30* (2009.01)

(52) U.S. Cl.
USPC ............ 370/332; 370/331; 455/436; 455/444

(58) Field of Classification Search
CPC ................................ H04W 36/00; H04W 36/30
USPC ........................... 370/331, 332; 455/436, 444
See application file for complete search history.

(56) References Cited

U.S. PATENT DOCUMENTS

| 5,422,933 | A  | * | 6/1995 | Barnett et al. ................. 455/439 |
| 7,092,710 | B1 |   | 8/2006 | Stoter et al. |
| 7,324,827 | B2 |   | 1/2008 | Pedraza et al. |
| 2002/0077140 | A1 | * | 6/2002 | Monogioudis et al. ....... 455/522 |
| 2003/0099215 | A1 | * | 5/2003 | O'Shea ......................... 370/331 |
| 2008/0004023 | A1 | * | 1/2008 | Chen et al. .................... 455/436 |
| 2008/0101318 | A1 | * | 5/2008 | Taaghol et al. ............... 370/342 |
| 2008/0201746 | A1 | * | 8/2008 | Xu et al. ......................... 725/54 |
| 2009/0005099 | A1 | * | 1/2009 | Jung et al. ..................... 455/517 |
| 2009/0036124 | A1 | * | 2/2009 | Kim et al. ..................... 455/434 |
| 2009/0075647 | A1 | * | 3/2009 | Lindoff et al. ................ 455/424 |
| 2009/0082021 | A1 | * | 3/2009 | Matsuzawa et al. .......... 455/436 |
| 2009/0264077 | A1 | * | 10/2009 | Damnjanovic ............... 455/63.1 |
| 2010/0029274 | A1 | * | 2/2010 | Deshpande et al. ........ 455/435.3 |
| 2011/0076999 | A1 | * | 3/2011 | Kazmi et al. .................. 455/423 |

OTHER PUBLICATIONS

3GPP TS 36.300 V8.1.0, "Evolved Universal Terrestrial Radio Access (E-UTRA) and Evolved Universal Terrestrial Radio Access Network (E-UTRAN)," Jun. 2007.
3GPP TS 36.304 V8.2.0, "User Equipment (UE) procedures in idle mode," May 2008.

* cited by examiner

*Primary Examiner* — Ayaz Sheikh
*Assistant Examiner* — Tarell Hampton
(74) *Attorney, Agent, or Firm* — Austin Rapp & Hardman (57) ABSTRACT

A method for base station reselection in a wireless communications system is disclosed. The method may determine a first indication of signal strength for a first signal sent from a first base station and received by a user equipment (UE). The method may also determine a second indication of signal strength for a second signal sent from a second base station and received by the UE. The method may further determine a relative signal strength based on the first indication of signal strength and the second indication of signal strength. The method may also determine a Q factor based on the relative signal strength. The Q factor may be an indication of when base station reselection should be performed.

42 Claims, 12 Drawing Sheets

HeNB 306

- eNodeB-HeNB separation distance (d) 310
- HeNB reselection distance (r) 312
- Q Factor calculation module 314
- Q Factor lookup table 316
- Q Factor 318
- eNodeB transmit power ($P_E$) 320
- HeNB transmit power ($P_H$) 322
- eNodeB RSSI ($P_{RXE}$) 324
- HeNB RSSI ($P_{RXH}$) 326
- Path-loss exponent (α) 328
- UE maximum tolerable interference (β) 330
- HeNB RSSI threshold (γ) 332
- eNodeB RSRP 334
- HeNB RSRP 336

UE 704
- eNodeB-HeNB separation distance (d) 710
- HeNB reselection distance (r) 712
- Q Factor calculation module 714
- Q Factor lookup table 716
- Q Factor 718
- eNodeB transmit power ($P_E$) 720
- HeNB transmit power ($P_H$) 722
- eNodeB RSSI ($P_{RxE}$) 724
- HeNB RSSI ($P_{RxH}$) 726
- Path-loss exponent (α) 728
- UE maximum tolerable interference (β) 730
- HeNB RSSI threshold (γ) 732
- eNodeB RSRP 734
- HeNB RSRP 736

| Q Factor Lookup Table 1116 | |
|---|---|
| eNodeB-HeNB separation distance | Q Factor |
| d1 | Q1 |
| d2 | Q2 |
| d3 | Q3 |
| ... | ... |

SYSTEMS AND METHODS FOR CLOSED SUBSCRIBER GROUP CELL RESELECTION

TECHNICAL FIELD

The present disclosure relates generally to communications and wireless communications systems. More specifically, the present disclosure relates to systems and methods for closed subscriber group cell reselection.

BACKGROUND

The 3rd Generation Partnership Project, also referred to as "3GPP," is a collaboration agreement that aims to define globally applicable Technical Specifications and Technical Reports for 3rd Generation Systems. 3GPP Long Term Evolution (LTE) is the name given to a project to improve the Universal Mobile Telecommunications System (UMTS) mobile phone or device standard to cope with future requirements. The 3GPP may define specifications for the next generation mobile networks, systems, and devices. In one aspect, UMTS has been modified to provide support and specification for the Evolved Universal Terrestrial Radio Access (E-UTRA) and Evolved Universal Terrestrial Radio Access Network (E-UTRAN). In 3GPP LTE a mobile terminal or device is called a "user equipment" (UE). A base station may be referred to as an evolved NodeB (eNodeB). A semi-autonomous base station/femto-cell may be referred to as a home eNodeB (HeNB).

A UE may have an established connection with either an eNodeB or an HeNB. A UE may reselect an HeNB or an eNodeB for the connection using an offset factor Q. The concept of using a Q Factor in reselection of an HeNB or an eNodeB is proposed in the current standard 3GPP-LTE Release 8. However methods and algorithms for computing the Q Factor and informing the UE about the value of Q are not specified.

DETAILED DESCRIPTION

A method for base station reselection in a wireless communications system is disclosed. The method may determine a first indication of signal strength for a first signal sent from a first base station and received by a user equipment (UE). The method may also determine a second indication of signal strength for a second signal sent from a second base station and received by the UE. The method may further determine a relative signal strength based on the first indication of signal strength and the second indication of signal strength. The method may also determine a Q factor based on the relative signal strength. The Q factor may be an indication of when base station reselection should be performed.

The first and second indications of signal strength may be received signal strength indicators (RSSI). Alternatively, the first and second indications of signal strength may be indications of reference signal received power (RSRP).

The method may also include sending the Q factor to a user equipment (UE). The method may be performed by the second base station. The second base station may be a home evolved NodeB (HeNB).

The method may be performed by the first base station. The first base station may be an evolved NodeB (eNodeB). The method may also be performed by a UE. The Q factor may be further based on the distance between the first base station and the second base station. The Q factor may be selected from a lookup table. The lookup table may be stored on an eNodeB. The Q factor may also be based on the interference tolerance of the UE.

The UE may have an established connection with the first base station. The UE may switch to a connection with the second base station based on the determined Q factor. The Q factor may be sent to the UE at the time of subscription. The Q factor may be sent to the UE over the broadcast channel. The proper entry for a preset lookup table on the UE may also be sent to the UE.

A home evolved NodeB (HeNB) for base station reselection in a wireless communications system is disclosed. The HeNB may include a processor, memory in electronic communication with the processor, and instructions stored in the memory. The instructions stored in the memory may be executable to determine a first indication of signal strength for a first signal sent from the HeNB and received by a user equipment (UE). The instructions stored in the memory may also be executable to determine a second indication of signal strength for a second signal sent from a base station and received by the UE. The instructions stored in the memory may also be executable to determine a relative signal strength based on the first indication of signal strength and the second indication of signal strength. The instructions stored in the memory may be further executable to determine a Q factor based on the relative signal strength. The Q factor may be an indication of when base station reselection should be performed.

The instructions stored in the memory may also be executable to send the Q factor to the UE. The base station may be an evolved NodeB (eNodeB). The Q factor may be further based on the distance between the base station and the HeNB. The Q factor may be selected from a lookup table. The Q factor may be based on the interference tolerance of the UE.

The UE may have an established connection with the base station. The UE may switch to a connection with the HeNB based on the determined Q factor. The Q factor may be sent to the UE at the time of subscription. The Q factor may be sent to the UE over the broadcast channel. The HeNB may send the proper entry for a preset lookup table to the UE.

A user equipment (UE) for base station reselection in a wireless communications system is disclosed. The UE may include a processor, memory in electronic communication with the processor, and instructions stored in the memory. The instructions stored in the memory may be executable to determine a first indication of signal strength for a first signal sent from a first base station and received by the UE. The instructions stored in the memory may also be executable to determine a second indication of signal strength for a second signal sent from a second base station and received by the UE. The instructions stored in the memory may also be executable to determine a relative signal strength based on the first indication of signal strength and the second indication of signal strength. The instructions stored in the memory may be further executable to determine a Q factor based on the relative signal strength. The Q factor may be an indication of when base station reselection should be performed.

The UE may determine the Q factor by receiving the Q factor from an evolved NodeB (eNodeB). The UE may also determine the Q factor by receiving the Q factor from a home evolved NodeB (HeNB). The first base station may be an evolved NodeB (eNodeB). The second base station may be a home evolved NodeB (HeNB). The UE may determine the Q factor by selecting a Q factor from a lookup table. The Q factor may be based on the interference tolerance of the UE.

The UE may have an established connection with the first base station. The UE may switch to a connection with the second base station based on the determined Q factor. The Q factor may be received from the second base station at the time of subscription. The Q factor may be received from the second base station over a broadcast channel. The UE may receive the Q factor by receiving the proper entry for a lookup table from the second base station. The UE may have an established connection with the first base station and switch to a connection with the HeNB based on the second indication of signal strength and a HeNB received signal strength indicator (RSSI) threshold.

The UE may have an established connection with the first base station. The UE may switch to a connection with the HeNB based on the second indication of signal strength and an HeNB reference signal received power (RSRP) threshold.

The present systems and methods may operate independent of the physical layer access technology used by the wireless network. Examples of access technologies include orthogonal frequency division multiplexing (OFDM), frequency division multiple access (FDMA), time division multiple access (TDMA), and code division multiple access (CDMA). In addition, the present systems and methods may operate independent of whether the system is full or half duplex.

For purposes of example, the present systems and methods are described in terms of 3GPP LTE systems. However, the present systems and methods may be utilized for other communication systems such as IEEE 802.16(e, m), WiMAX systems, and other systems where the use of semi-autonomous base stations is warranted.

Figure 1:
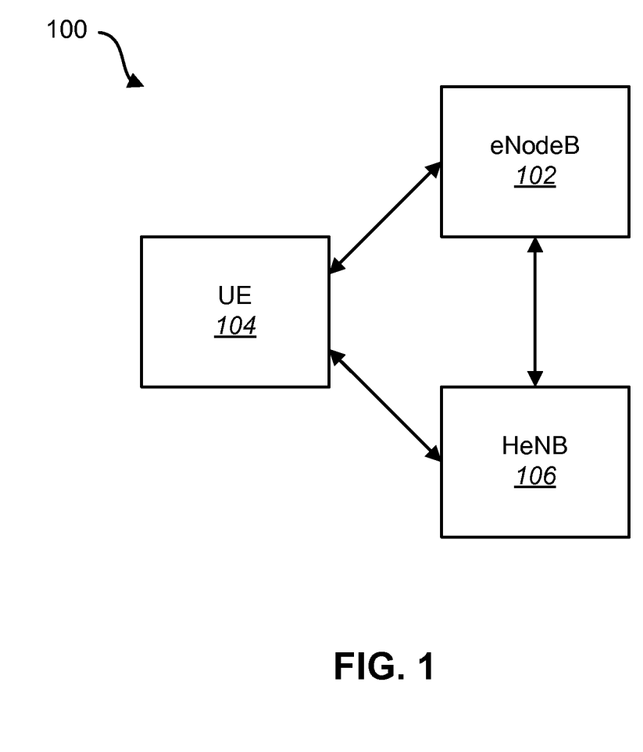
FIG. 1 illustrates a wireless communication system in which the present systems and methods may be practiced.

FIG. 1 illustrates a wireless communication system 100 in which the present systems and methods may be practiced. A mobile station may be referred to as user equipment (UE) 104. In a cellular wireless communication system 100, the central base station may be an evolved NodeB (eNodeB) 102. An eNodeB 102 may be in wireless communication with one or more UEs 104 (which may also be referred to as mobile stations, user devices, communications devices, subscriber units, access terminals, terminals, etc.).

The eNodeB 102 may handle the actual communication across a radio interface, covering a specific geographical area in the vicinity of the eNodeB 102, which is referred to as a cell. Depending on sectoring, one or more cells may be served by the eNodeB 102, and accordingly the eNodeB 102 may support one or more UEs 104 depending on where the UEs 104 are located. A UE 104 may have an established connection with the eNodeB 102.

In one configuration, the eNodeB 102 provides a 3GPP (Release 8) Long Term Evolution (LTE) air interface and performs radio resource management for the communication system 100. In addition to the cell structure, 3GPP allows small regions within a cell that are controlled by semi-autonomous base stations known as home eNodeBs (HeNBs) 106. An HeNB 106 may also be referred to as a femto-cell. An HeNB 106 may be in electronic communication with one or more UEs 104 that are part of a private group known as a Closed Subscriber Group (CSG). A UE 104 may have an established connection with an HeNB 106. The UEs 104 that are part of the CSG may switch from a connection with an eNodeB 102 to an HeNB 106 associated with the CSG when circumstances warrant the switch. The UEs 104 may also switch from a connection with an HeNB 106 to a connection with an eNodeB 102 when circumstances warrant the switch.

Although not shown, a wireless communication system 100 may include more than one eNodeB 102 and more than one HeNB 106. Additionally, a wireless communication system 100 may include more than one UE 104.

The eNodeB 102 may be in electronic communication with one or more UEs 104. The eNodeB 102 may transmit data to the UEs 104 and receive data from the UEs 104 over a radio frequency (RF) communication channel. Likewise, an HeNB 106 may be in electronic communication with one or more UEs 104. The HeNB 106 may also transmit data to the UEs 104 and receive data from the UEs 104 over an RF communication channel. An eNodeB 102 may be in electronic communication with one or more HeNBs 106 using wired or wireless means. Likewise, an HeNB 106 may be in electronic communication with one or more eNodeBs 102 using wired or wireless means.

It may be preferable that a UE 104 establish a connection with an HeNB 106, as opposed to an eNodeB 102, provided that the UE 104 belongs to the CSG of the particular HeNB 106. The procedure whereby a UE 104 switches the connection from an eNodeB 102 to an HeNB 106 may be referred to as a handover or handoff when the UE 104 is active. A UE 104 may be active when the UE 104 is sending or receiving voice or data. The procedure whereby a UE 104 in idle mode switches the connection from an eNodeB 102 to an HeNB 106 or from an HeNB 106 to an eNodeB 102 may be referred to as a reselection.

Figure 2:
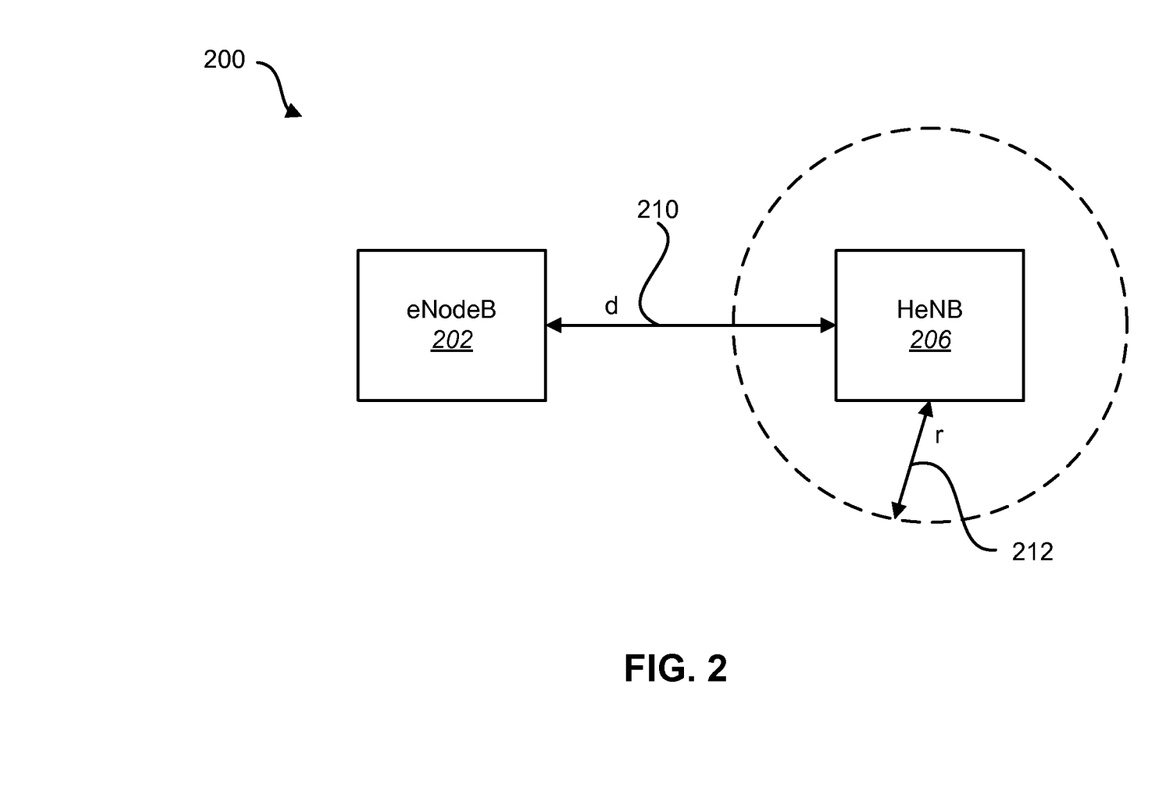
FIG. 2 illustrates a block diagram of a wireless communication system in which a reselection by a UE from an HeNB to an eNodeB or from an eNodeB to an HeNB may occur.

FIG. 2 illustrates a block diagram of a wireless communication system 200 in which a reselection by a UE 104 from an HeNB 106 to an eNodeB 102 or from an eNodeB 102 to an HeNB 106 may occur. The wireless communication system 200 may include an eNodeB 202 and an HeNB 206 in electronic communication. The eNodeB 202 and the HeNB 206 may be separated by a distance d 210. The distance d 210 may also be referred to as the eNodeB-HeNB separation distance 210.

The HeNB 206 may be at the center of a circle with a radius r 212. The radius r 212 may also be referred to as the HeNB reselection distance 212. The HeNB reselection distance 212 may define the distance between a UE 104 and the HeNB 206 where reselection is desirable. For example, a UE 104 may have an established connection with the eNodeB 202 when the UE 104 is outside the HeNB reselection distance 212. When the UE 104 moves inside the HeNB reselection distance 212, it may be warranted for the UE 104 to reselect or switch the established connection from the eNodeB 202 to the HeNB 206. Likewise, when the UE 104 moves from inside the HeNB reselection distance 212 to outside the HeNB reselection distance 212, it may be warranted for the UE 104 to reselect or switch the established connection from the HeNB 206 to the eNodeB 202.

The UE 104 may determine when reselection is warranted by using a Q Factor. The Q Factor may be an internal parameter for each HeNB 206. Reselection may be warranted when $RSSI_{HeNB}+Q \geq RSSI_{eNB}$ where $RSSI_{HeNB}$ is the received signal strength indicator (RSSI) at the UE 104 from the HeNB 206 (in dB) and $RSSI_{eNB}$ is the RSSI at the UE 104 from the eNodeB 202 (in dB). In place of RSSI, which is the measurement taken on a frequency, reselection may also be based on the reference signal received power (RSRP) which is the measurement taken on a cell. The RSRP may be used in place of the RSSI for all of the calculations below. The RSSI and the RSRP may be indications of the signal strength received by a UE. The Q Factor may also be a number in dB. The Q Factor may be dependent on the location of an HeNB 206 within a cell rather than being constant throughout a cell. The value of the Q Factor may be calculated using a function with the format of:

$$Q=f(RSSI_{HeNB},RSSI_{eNB},C) \quad (1)$$

where C is a constant and may account for system parameters such as load balancing, congestion control, and quality of service (QoS) requirements. All HeNBs 206 and UEs 104 may use the same function for computing the Q Factor. Alternatively, each HeNB 206 and each UE 104 may compute the value of the Q Factor using unique functions.

The Q Factor may be calculated by the HeNB 206 and transmitted to the UE 104 (discussed below in relation to FIG. 4), selected from a lookup table by the HeNB 206 and transmitted to the UE 104 (discussed below in relation to FIG. 5), selected from a lookup table by the UE 104 (discussed below in relation to FIG. 7), or calculated by the UE 104 (discussed below in relation to FIG. 8).

Figure 3:
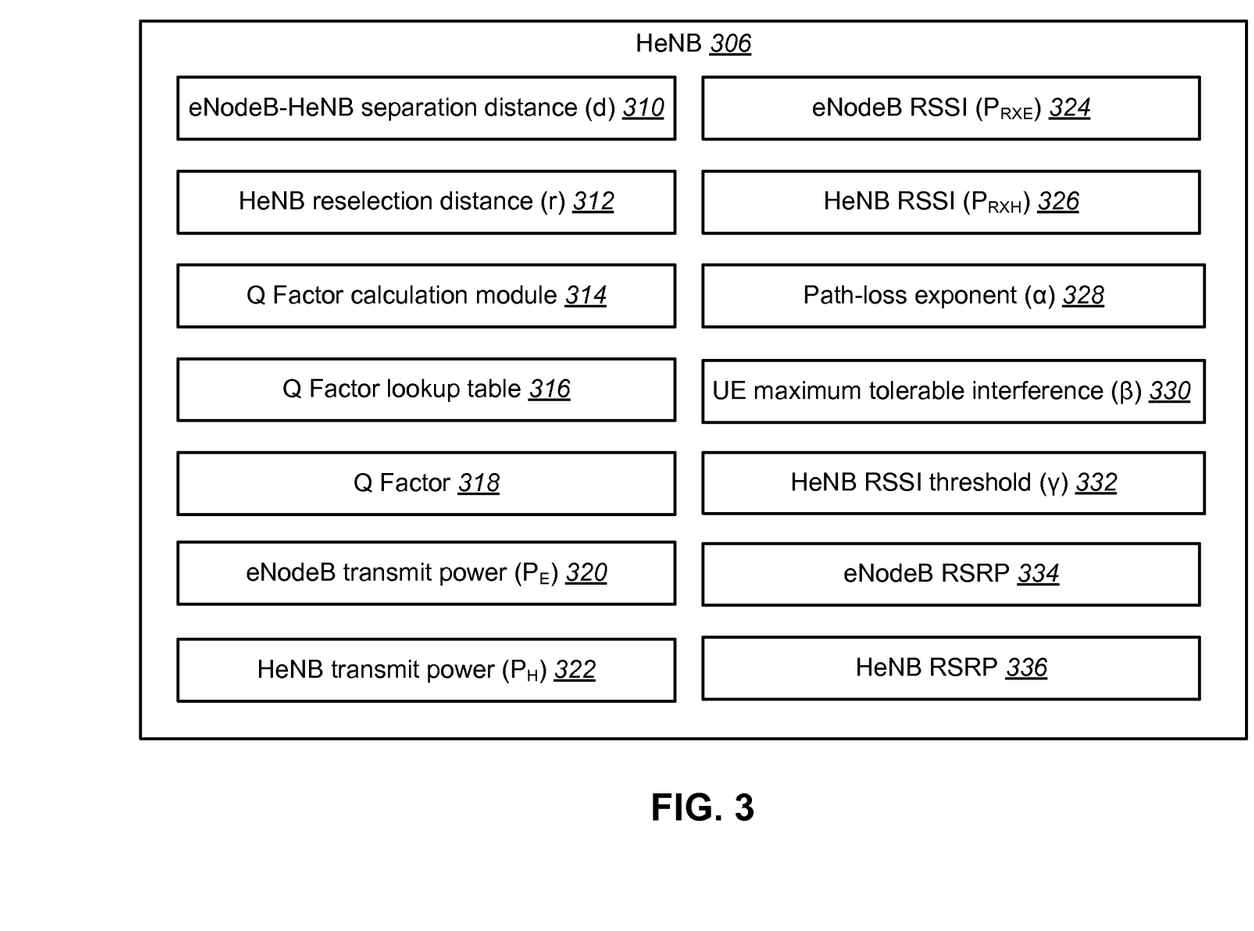
FIG. 3 is a block diagram illustrating the components and settings of an HeNB.

FIG. 3 is a block diagram illustrating the components and settings of an HeNB 306. The HeNB 306 may include the eNodeB-HeNB separation distance 310 and the HeNB reselection distance 312. The HeNB reselection distance 312 may be a predefined radius around the HeNB 306 that defines the area where reselection by a UE 104 from an established connection with an eNodeB 202 to an established connection with the HeNB 306 is warranted. The HeNB reselection distance 312 may also define the area where reselection by a UE 104 from an established connection with the HeNB 306 to an established connection with an eNodeB is warranted. The HeNB 306 may further include the eNodeB transmit power ($P_E$) 320 and the HeNB transmit power ($P_H$) 322. The HeNB 306 may also include the eNodeB RSSI ($P_{RXE}$) 324 and the HeNB RSSI ($P_{RXH}$) 326.

The HeNB 306 may further include a Q Factor calculation module 314. The Q Factor calculation module 314 may use calculation algorithms and Q Factor calculation information such as the eNodeB-HeNB separation distance 310, the HeNB reselection distance 312, the eNodeB transmit power 320, and the HeNB transmit power 322 to calculate the Q Factor 318. The HeNB 306 may also include a Q Factor lookup table 316 (discussed below in relation to FIG. 11). The HeNB 306 may determine the Q Factor 318 by finding the Q Factor 318 associated with the Q Factor calculation information in the Q Factor lookup table 316. For example, the Q Factor lookup table 316 may have different Q Factors 318 associated with each eNodeB-HeNB separation distance 310.

The HeNB 306 may also include the determined Q Factor 318, the path-loss exponent ($\alpha$) 328, the UE maximum interference ($\beta$) 330, and a received signal strength indicator (RSSI) threshold ($\gamma$) 332 for signals received from the HeNB 306 by the UE 104. The HeNB 306 may further include a reference received signal power (RSRP) threshold (not shown) for signals received from the HeNB 306 by the UE 104. An RSRP is similar to the RSSI except that the RSRP is the measurement taken on a cell and the RSSI is the measurement taken on a frequency. The HeNB 306 may also include the eNodeB RSRP 334 and the HeNB RSRP 336.

Figure 4:
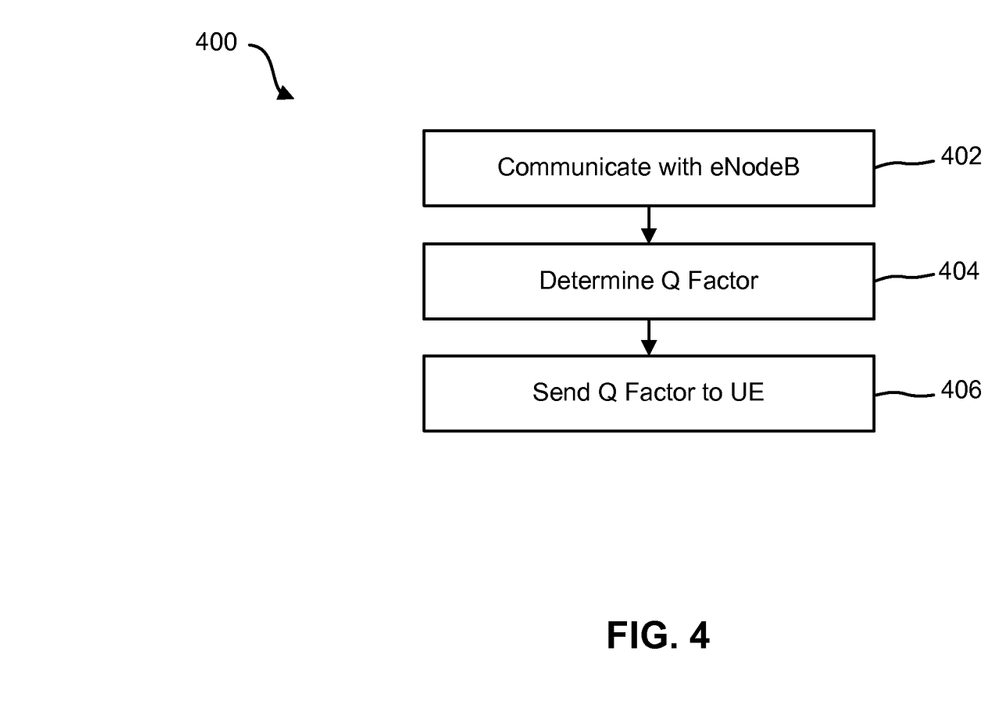
FIG. 4 is a flow diagram illustrating a method for determining the Q Factor and informing a UE of the determined Q Factor.

FIG. 4 is a flow diagram illustrating a method 400 for determining the Q Factor 318 and informing a UE 104 of the determined Q Factor 318. An HeNB 306 may communicate 402 with an eNodeB 202. The HeNB 306 may communicate 402 with the eNodeB 202 using wired or wireless means. An HeNB 306 may be in electronic communication with multiple eNodeBs 202. Likewise, an eNodeB 202 may be in electronic communication with multiple HeNBs 306.

The HeNB 306 may determine 404 the Q Factor 318. The HeNB 306 may then send 406 the Q Factor 318 to one or more UEs 104. The HeNB 306 may explicitly send 406 the Q Factor 318 to a UE 104 at the time of subscription of the UE 104 or when the UE 104 is in active mode. Alternatively, the HeNB 306 may send 406 the Q Factor 318 to a UE 104 at any point after the HeNB 306 has determined the Q Factor 318. The HeNB 306 may broadcast the value of the Q Factor 318 using the broadcast channel. A UE 104 may receive the Q Factor 318 over the broadcast channel in active mode and/or in idle mode. The contents of the broadcast channel may be related to the system parameters. If the UE 104 has not received an updated Q Factor 318 value, the UE 104 may use an existing Q Factor 318 value. Upon establishing a connection with the HeNB 306, the UE 104 may update the Q Factor 318 value.

Figure 5:
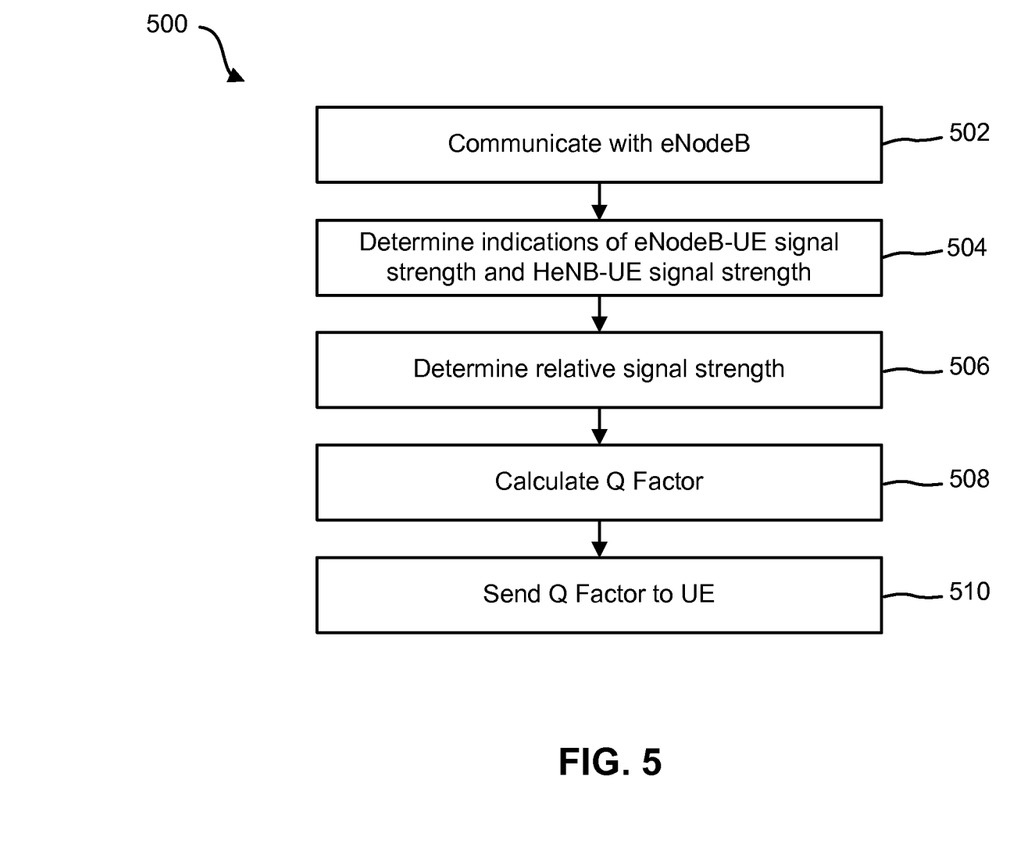
FIG. 5 is a flow diagram illustrating a method for determining an HeNB Q Factor and informing a UE of the determined Q Factor.

FIG. 5 is a flow diagram illustrating a method 500 for determining an HeNB 306 Q Factor 318 and informing a UE 104 of the determined Q Factor 318. An HeNB 306 may communicate 502 with an eNodeB 202. The HeNB 306 may determine 504 an indication of the eNodeB-UE signal strength and an indication of the HeNB-UE signal strength. The HeNB may determine 506 the relative signal strength. The relative signal strength may be based on the indication of eNodeB-UE signal strength and the indication of HeNB signal strength. The HeNB 306 may receive additional information that can be used to calculate the Q Factor 318 such as the eNodeB-HeNB separation distance 312, the path-loss exponent ($\alpha$) 328, the UE maximum tolerable interference ($\beta$) 330, and a received signal strength indicator (RSSI) threshold ($\gamma$) 332 for signals received from the HeNB 306 by the UE 104. The HeNB 306 may calculate the threshold $\gamma$ 332 or receive the threshold $\gamma$ 332 from the UE 104. The HeNB 306 may then calculate 508 the Q Factor 318.

The HeNB 306 may calculate 508 the Q Factor 318 using several different methods. Equation (1) may be satisfied by equality to determine the point at which reselection should take place. If equation (1) is converted into watts instead of dB, equation (1) becomes:

$$P_{RXe}=qP_{RXH} \quad (2)$$

where $P_{RXe}$ is the received power (in watts) at the UE 104 from the eNodeB 202, $P_{RXH}$ is the received power (in watts) at the UE 104 from the HeNB 306, and q is the Q Factor 318 (in watts), where $Q=10 \log_{10}(q)$.

In the first method for calculating the Q Factor 318, the HeNB 306 may calculate 508 the Q Factor 318 based on the HeNB reselection distance 312. It may be assumed that the reselection should occur at the HeNB reselection distance 312, which is a distance r from the HeNB 306. The received power $P_{RXe}$ (in watts) at the UE 104 from the eNodeB 202 in (2) may be obtained by $$P_{RXe} = \frac{P_e}{(d-r)^\alpha} \qquad (3)$$

where $P_e$ is the eNodeB transmit power 320, d is the eNodeB-HeNB separation distance 310, r is the HeNB reselection distance 312, and $\alpha$ is the path-loss exponent 328.

The received power $P_{RXH}$ (in watts) at the UE 104 from the HeNB 202 in (2) may be obtained by:

$$P_{RXH} = \frac{P_H}{r^\alpha} \qquad (4)$$

where $P_H$ is the HeNB transmit power 322.

Replacing equation (3) and equation (4) into equation (2) and solving for q gives:

$$q = \frac{P_e}{P_H} \frac{r^\alpha}{(d-r)^\alpha} \qquad (5)$$

as a first method for calculating the Q Factor 318.

A second method for calculating the Q Factor 318 may base the Q Factor 318 on an interference constraint. The maximum tolerable interference by a UE 330 may be denoted by $\beta$. Thus:

$$\frac{P_{RXH}}{P_{RXe}} \geq \beta \qquad (6)$$

If the Q Factor 318 is calculated such that reselection will occur when equation (6) is solved for equality and equations (3) and (4) are replaced into equation (6), equation (6) becomes:

$$\frac{P_H}{P_e} \frac{(d-r)^\alpha}{r^\alpha} = \beta \qquad (7)$$

Equation (7) is a nonlinear equation in which all parameters except r are known. Solving equation (7) for r provides the HeNB reselection distance 312 or the distance from the HeNB 306 where reselection is warranted. The value of r can then be replaced in equation (5) to determine the Q Factor 318 that satisfies the interference constraint of equation (6).

Once the HeNB 306 has calculated the Q Factor 318, the HeNB 306 may send 510 the Q Factor 318 to a UE 104. As discussed above, the HeNB 306 may send 510 the Q Factor 318 to a UE 104 at the time of subscription, when the UE 104 is in active mode, or on the broadcast channel such that the UE 104 may receive the Q factor 318 in active mode and/or idle mode.

Figure 6:
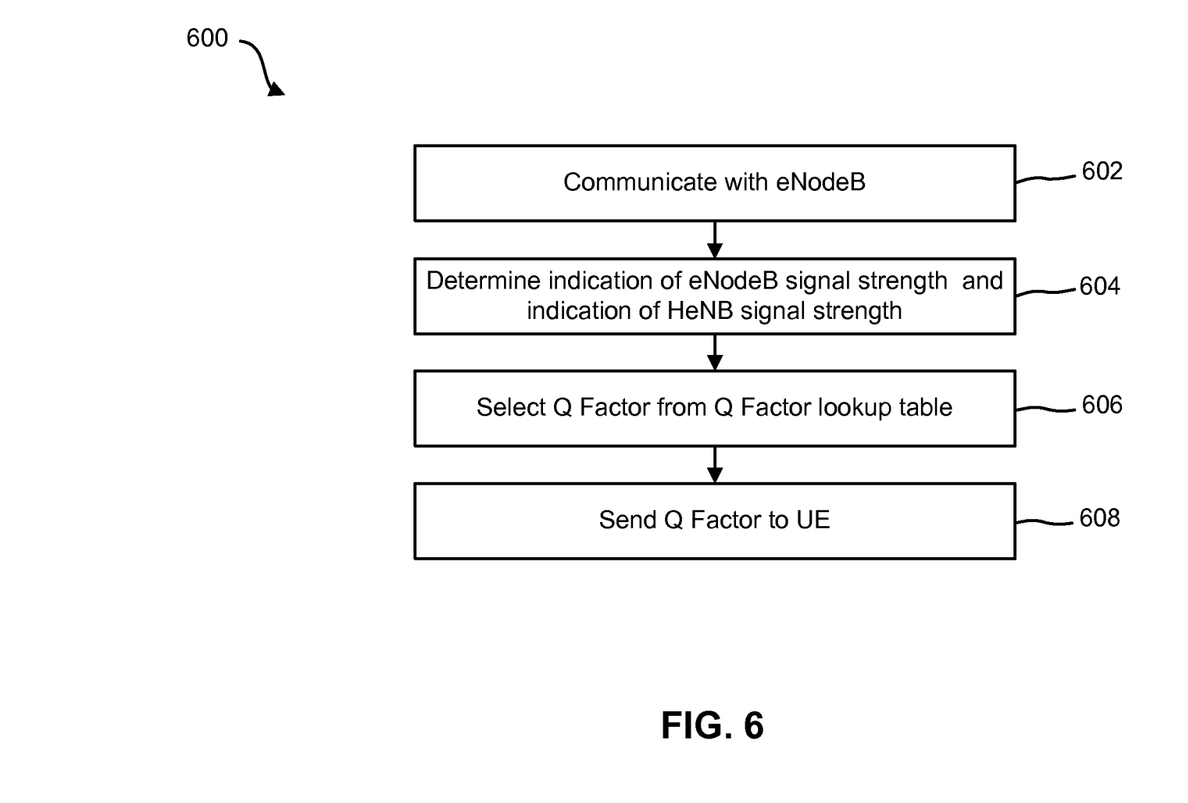
FIG. 6 is a flow diagram illustrating a method for selecting an HeNB Q Factor from a Q Factor lookup table and informing a UE of the selected Q Factor.

FIG. 6 is a flow diagram illustrating a method 600 for selecting an HeNB 306 Q Factor 318 from a Q Factor lookup table 316 and informing a UE 104 of the selected Q Factor 318. An HeNB 306 may communicate 602 with an eNodeB 202. The HeNB 306 may determine 604 an indication of the eNodeB-UE signal strength and an indication of the HeNB-UE signal strength. The HeNB 306 may then select 606 the Q Factor 318 from a Q Factor lookup table 316 that corresponds to the indications of the eNodeB-UE signal strength and the HeNB-UE signal strength. Alternatively, the HeNB 306 may select 606 the Q Factor 318 from a Q Factor lookup table 316 that corresponds to the relative signal strength. As discussed above, the relative signal strength may be calculated based on the indications of the eNodeB-UE signal strength and the HeNB-UE signal strength. Alternatively still, the HeNB 306 may select 606 the Q Factor 318 from the Q Factor lookup table 316 that corresponds to the eNodeB-HeNB separation distance 310. The HeNB 306 may send 608 the selected Q Factor 318 to a UE 104.

Figure 7:
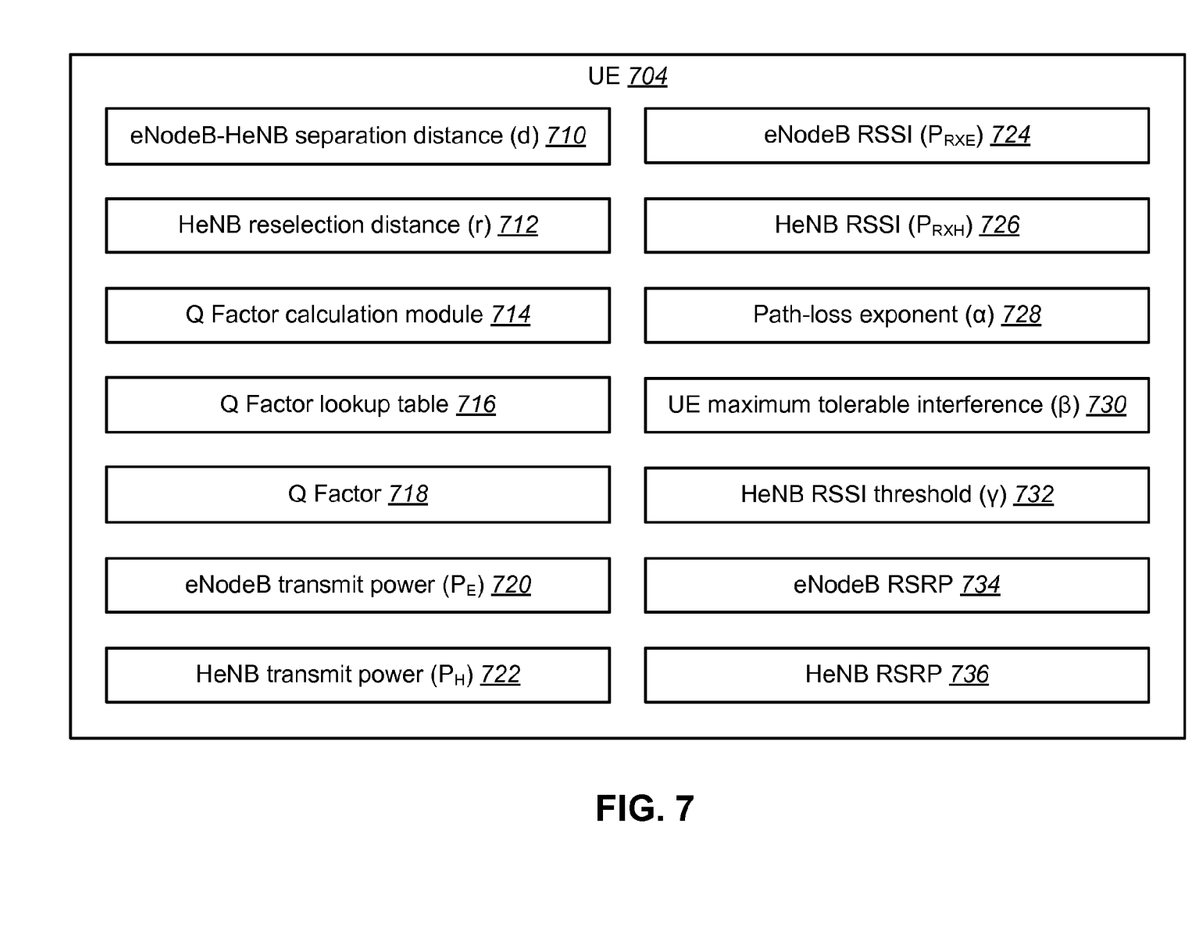
FIG. 7 is a block diagram illustrating the components and settings of a UE.

FIG. 7 is a block diagram illustrating the components and settings of a UE 704. The UE 704 may include the eNodeB-HeNB separation distance (d) 710, the HeNB reselection distance (r) 712, a Q Factor calculation module 714, a Q Factor lookup table 716, and a Q Factor 718. The Q Factor 718 may be calculated by the UE 704. Alternatively, the Q Factor 718 may be received from an HeNB 306. Alternatively still, the Q Factor 718 may be selected from a preset Q Factor lookup table 716 by the UE 704.

The UE 704 may also include the eNodeB received signal strength indicator (RSSI) ($P_{RXE}$) 724 and the HeNB RSSI ($P_{RXH}$) 726. The UE 704 may further include the eNodeB transmit power ($P_E$) 720 and the HeNB transmit power ($P_H$) 722. The UE 704 may also include the path-loss exponent ($\alpha$) 728, the UE maximum tolerable interference ($\beta$) 730, and an HeNB RSSI threshold ($\gamma$) 732. The UE 704 may receive Q Factor determining information such as the eNodeB-HeNB separation distance 710, the HeNB reselection distance 712, the eNodeB transmit power 720, and the HeNB transmit power 722 from the HeNB 306.

The UE 704 may further include a reference received signal power (RSRP) threshold (not shown) for signals received from the HeNB 306 by the UE 704. An RSRP is similar to the RSSI except that the RSRP is the measurement taken on a cell and the RSSI is the measurement taken on a frequency. The UE 704 may further include the eNodeB RSRP 734 and the HeNB RSRP 736.

Figure 8:
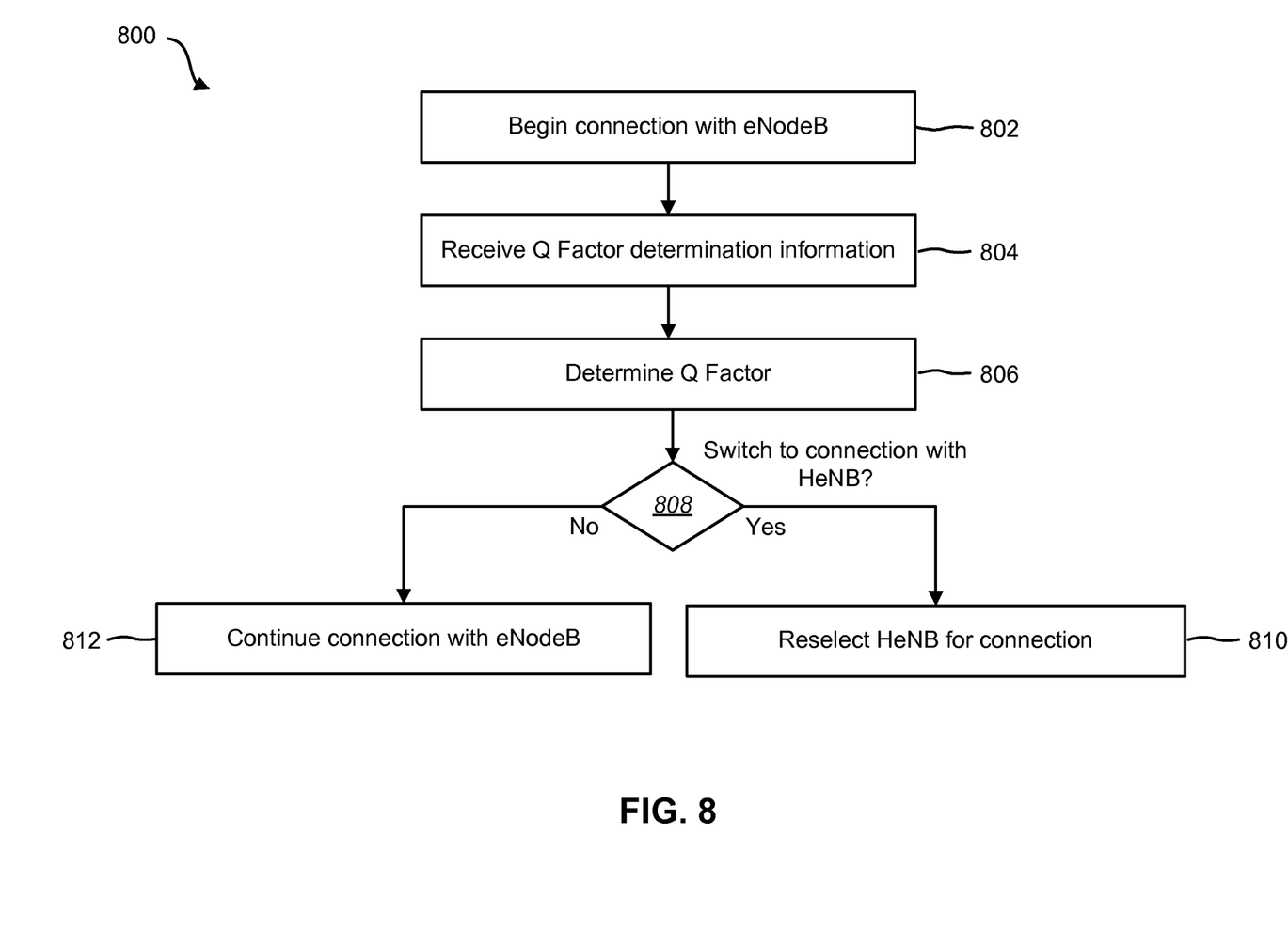
FIG. 8 is a flow diagram illustrating a method for determining a Q Factor by a UE.

FIG. 8 is a flow diagram illustrating a method 800 for determining a Q Factor 718 by a UE 704. A UE 704 may begin 802 a connection with an eNodeB 202. The UE 704 may receive 804 Q Factor determination information from an HeNB 306. The UE 704 may then determine 806 the Q Factor 718. The UE 704 may determine 806 the Q Factor 718 using a calculation/algorithm. The UE 704 may calculate the Q Factor 718 using the same methods as the HeNB 306 (see description for FIG. 5 above). Thus, the UE 704 may calculate the Q Factor 318 based on the HeNB reselection distance 712 or the UE maximum tolerable interference 730 constraint.

The UE 704 may also determine whether reselection is warranted without the use of the Q Factor 718. Instead, the UE 704 may determine whether reselection is warranted based on only the received signal from the HeNB 306 and an HeNB RSSI threshold ($\gamma$) 732. The UE 704 may measure the received HeNB signal strength 726 and reselect the HeNB 306 for the connection when the HeNB received signal strength 726 is above the HeNB RSSI threshold $\gamma$ 732.

$$P_{RXH} \geq \gamma \qquad (8)$$

Replacing equation (4) into equation (8) gives equation (9).

$$r = \left(\frac{\gamma}{P_H}\right)^{1/\alpha} \quad (9)$$

An HeNB 306 may determine the value of the HeNB RSSI threshold γ 732 using equation (9). The HeNB 306 may then convey the HeNB RSSI threshold γ 732 to the UE 704. The HeNB 306 may send the HeNB RSSI threshold γ 732 to a UE 704 at the time of subscription or active mode. Alternatively, the HeNB 306 may send the HeNB RSSI threshold γ 732 to a UE 704 using the broadcast channel, thus allowing each UE 704 to receive the HeNB RSSI threshold γ 732 over the broadcast channel in active and/or idle mode. Alternatively still, the UE 704 may calculate the HeNB RSSI threshold γ 732 using equation (9). The UE 704 may receive the values of r 712 and $P_H$ 722 from the HeNB 306 to calculate the HeNB RSSI threshold γ 732. A UE 704 may also use an existing value for the HeNB RSSI threshold γ 732 if an updated HeNB RSSI threshold γ 732 value is absent.

The UE 704 may then determine 808 whether to switch to a connection with the HeNB 306. The determination may be based on the Q Factor 318. The determination may also be based on the HeNB RSSI threshold γ 732. If it is determined that the UE 704 should switch to a connection with the HeNB 306, the UE 704 may reselect 810 the HeNB 306 for the connection. If it is determined that the UE 704 should not switch to a connection with the HeNB 306, the UE 704 may continue 812 the connection with the eNodeB 202.

Figure 9:
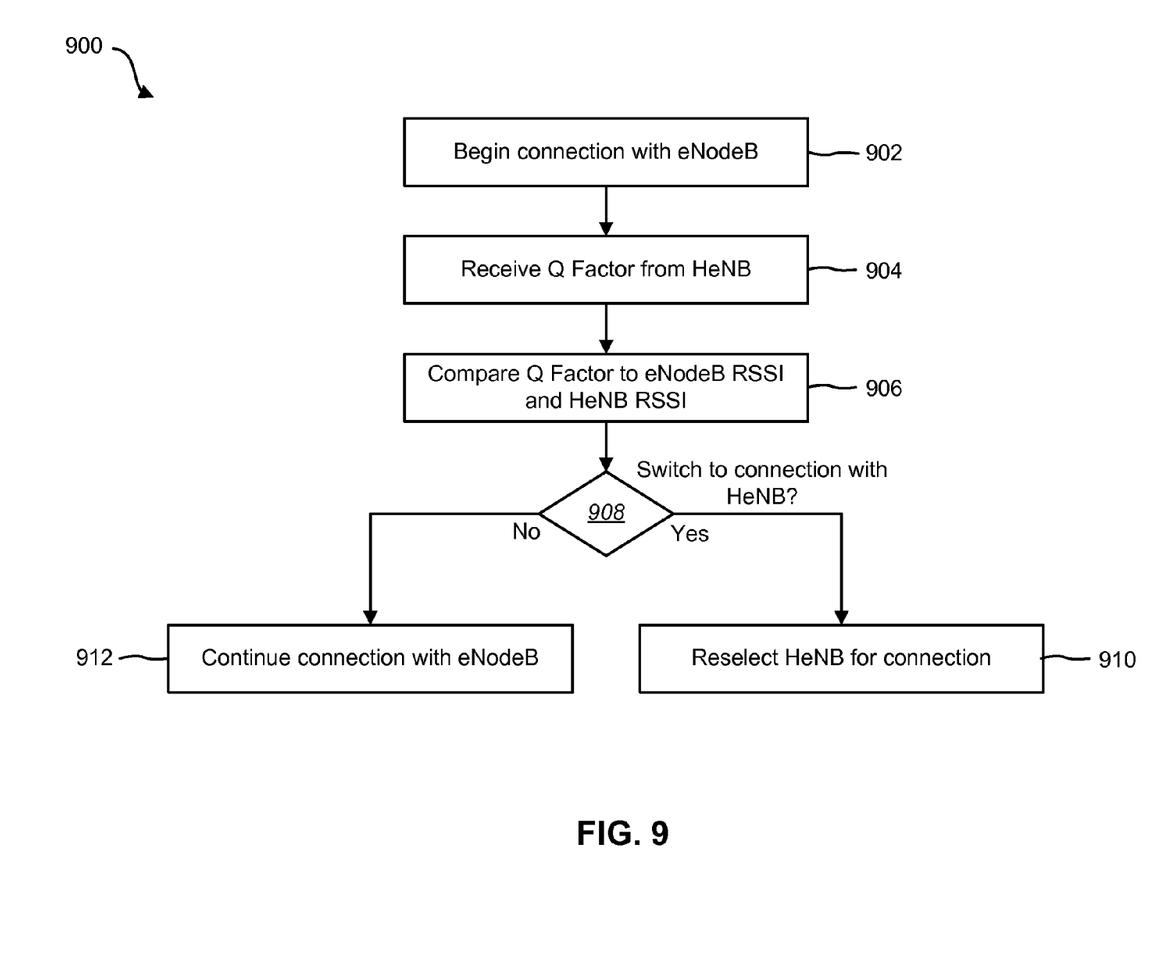
FIG. 9 is a flow diagram illustrating a method for receiving a Q Factor from an HeNB and using the Q Factor to determine reselection.

FIG. 9 is a flow diagram illustrating a method 900 for receiving a Q Factor 718 from an HeNB 306 and using the Q Factor 718 to determine reselection. A UE 704 may begin 902 a connection with an eNodeB 202. The UE 704 may receive 904 a Q Factor 718 from an HeNB 306. The UE 704 may compare 906 the Q Factor 718 to the eNodeB RSSI 724 and the HeNB RSSI 726. As discussed above in relation to FIG. 2, the UE 704 may compare 906 the Q Factor 718 to the eNodeB RSSI 724 and the HeNB RSSI 726 using the formula $RSSI_{HeNB} + Q \geq RSSI_{eNB}$. The UE 704 may determine 908 whether to switch to a connection with the HeNB 306 when the HeNB RSSI 726 plus the Q Factor 718 is greater than the eNodeB RSSI 724. If it is determined that the UE 704 should switch to a connection with the HeNB 306, the UE 704 may reselect 910 the HeNB 306 for the connection. If it is determined that the UE 704 should not switch to a connection with the HeNB 306, the UE 704 may continue 912 the connection with the eNodeB 202.

Figure 10:
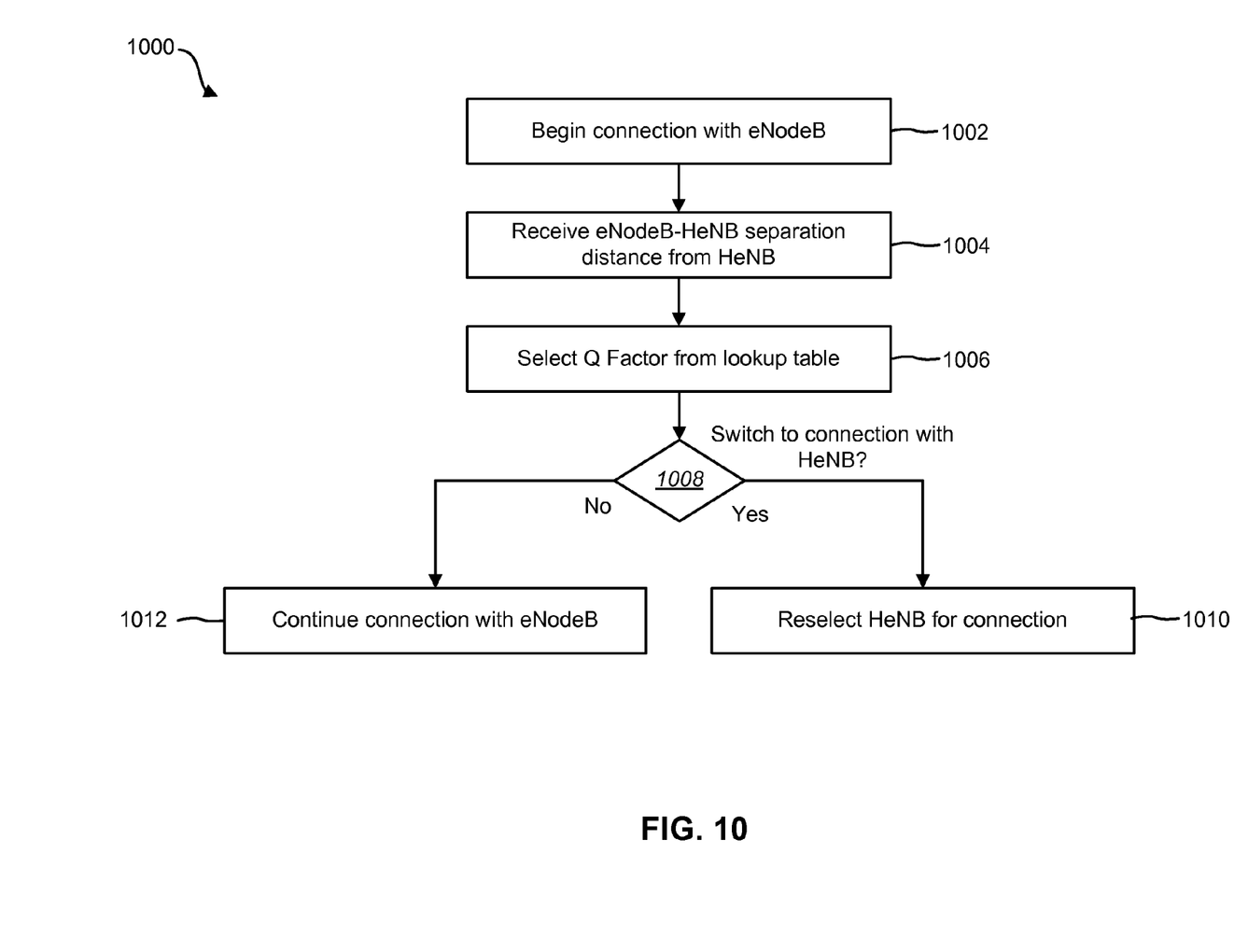
FIG. 10 is a flow diagram illustrating a method for selecting a Q Factor from a Q Factor lookup table.

FIG. 10 is a flow diagram illustrating a method 1000 for selecting a Q Factor 718 from a Q Factor lookup table 716. A UE 704 may begin 1002 a connection with an eNodeB 202. The UE 704 may receive 1004 the eNodeB-HeNB separation distance 710 from the HeNB 202. The UE 704 may select 1006 the Q Factor 718 from a preset Q Factor lookup table 716 that corresponds to the received eNodeB-HeNB separation distance 710. The UE 704 may then determine 1008 whether to switch to a connection with the HeNB 306. If it is determined that the UE 704 should switch to a connection with the HeNB 306, the UE 704 may reselect 1010 the HeNB 306 for the connection. If it is determined that the UE 704 should not switch to a connection with the HeNB 306, the UE 704 may continue 1012 the connection with the eNodeB 202.

Figure 11:
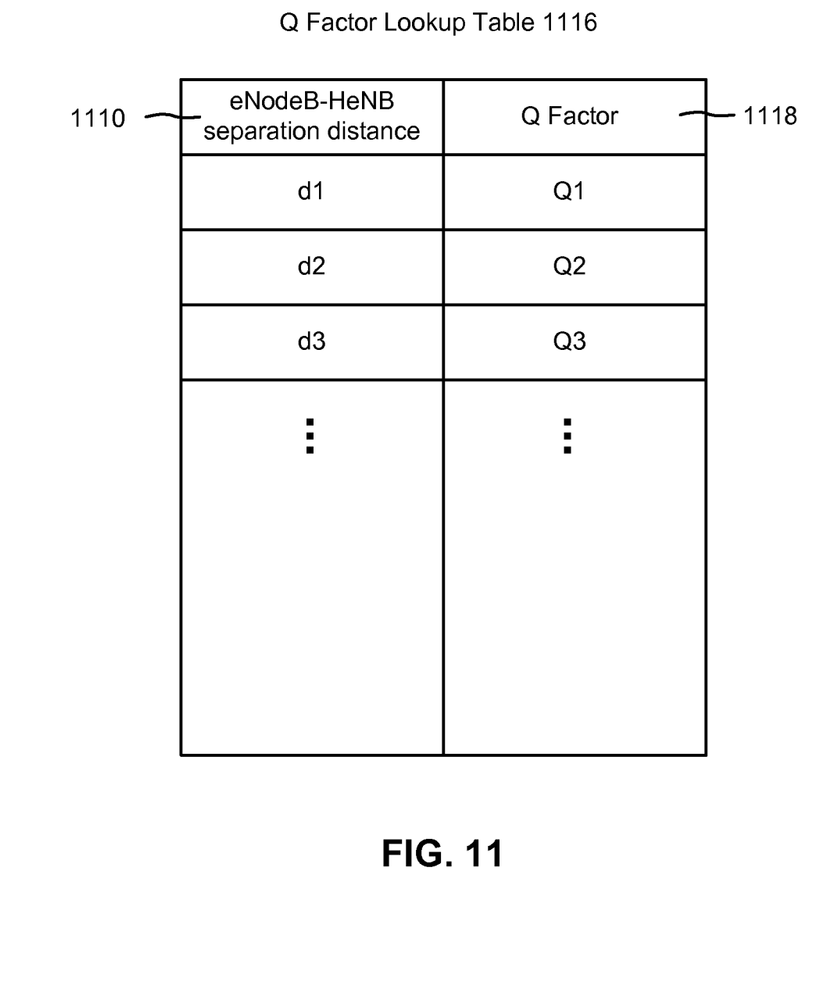
FIG. 11 illustrates an exemplary Q Factor lookup table.

FIG. 11 illustrates an exemplary Q Factor lookup table 1116. The Q Factor lookup table 1116 may be stored on the UE 704, the HeNB 306, and/or the eNodeB 202. The Q Factor lookup table 1116 may be a preset table with Q Factors 1118 corresponding to the eNodeB-HeNB separation distance 1110. Alternatively, the Q Factor lookup table 1116 may be dynamically adjusted to optimize the Q Factor 1118 values in the Q Factor lookup table 1116. The Q Factor lookup table 1116 may include additional criteria (not shown) when determining the appropriate Q Factor 1118 such as the eNodeB transmit power 720, the HeNB transmit power 722, and the UE maximum tolerable interference 730.

Figure 12:
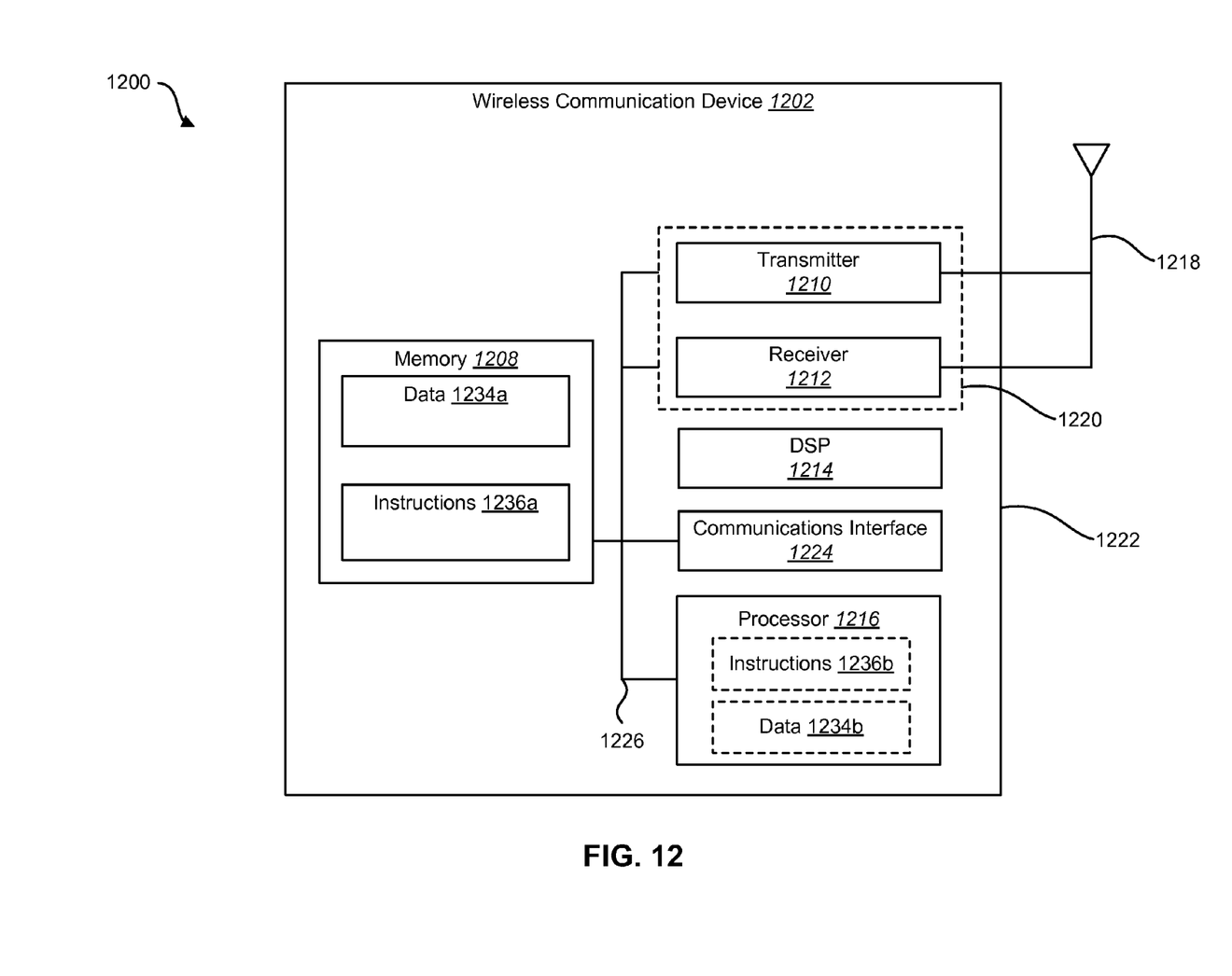
FIG. 12 is a block diagram of a wireless communication device in accordance with one configuration of the described systems and methods.

FIG. 12 is a block diagram of a wireless communication device 1202 in accordance with one configuration of the described systems and methods. The wireless communication device may be an eNodeB, a UE, an HeNB, or the like. The wireless communication device 1202 may include a transceiver 1220 that includes a transmitter 1210 and a receiver 1212. The transceiver 1220 may be coupled to one or more antennas 1218. The wireless communication device 1202 may further include a digital signal processor (DSP) 1214, a general purpose processor 1216, memory 1208, and a communications interface 1224. The various components of the wireless communication device 1202 may be included within a housing 1222.

The processor 1216 may control operation of the wireless communication device 1202. The processor 1216 may also be referred to as a CPU. The memory 1208, which may include both read-only memory (ROM) and random access memory (RAM), provides instructions 1236a and data 1234a to the processor 1216. A portion of the memory 1208 may also include non-volatile random access memory (NVRAM). The memory 1208 may include any electronic component capable of storing electronic information, and may be embodied as ROM, RAM, magnetic disk storage media, optical storage media, flash memory, on-board memory included with the processor 1216, EPROM memory, EEPROM memory, registers, a hard disk, a removable disk, a CD-ROM, etc.

The memory 1208 may store program instructions 1236a and other types of data 1234a. The program instructions 1236a may be executed by the processor 1216 to implement some or all of the methods disclosed herein. The processor 1216 may also use the data 1234a stored in the memory 1208 to implement some or all of the methods disclosed herein. As a result, instructions 1236b and data 1234b may be loaded and/or otherwise used by the processor 1216.

In accordance with the disclosed systems and methods, the antenna 1218 may receive signals that have been transmitted from a nearby communications device, such as a UE 104, an eNodeB 102, or an HeNB 106. The antenna 1218 provides these received signals to the transceiver 1220 which filters and amplifies the signals. The signals are provided from the transceiver 1220 to the DSP 1214 and to the general purpose processor 1216 for demodulation, decoding, further filtering, etc.

The various components of the wireless communication device 1202 are coupled together by a bus system 1226 which may include a power bus, a control signal bus, and a status signal bus in addition to a data bus. However, for the sake of clarity, the various busses are illustrated in FIG. 12 as the bus system 1226.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for base station reselection in a wireless communications system, the method comprising:
   determining a first indication of signal strength for a first signal sent from a first base station and received by a user equipment (UE);
   determining a second indication of signal strength for a second signal sent from a second base station and received by the UE, wherein at least one of the first base station and the second base station is a home evolved NodeB (HeNB);
   determining a relative signal strength based on the first indication of signal strength and the second indication of signal strength; and
   determining a Q factor based on the relative signal strength and a location of a preset HeNB reselection distance, and an HeNB transmit power, wherein each Q factor corresponds to an HeNB, and wherein the Q factor is an indication of when base station reselection should be performed.

2. The method of claim 1, wherein the first and second indications of signal strength are received signal strength indicators (RSSI).

3. The method of claim 1, wherein the first and second indications of signal strength are indications of reference signal received power (RSRP).

4. The method of claim 1, further comprising sending the Q factor to the UE.

5. The method of claim 4, wherein sending the Q factor to the UE comprises sending the Q factor to the UE at the time of subscription.

6. The method of claim 4, wherein sending the Q factor to the UE comprises sending the Q factor over the broadcast channel.

7. The method of claim 4, wherein sending the Q factor to the UE comprises sending the proper entry for a preset lookup table on the UE.

8. The method of claim 1, wherein the method is performed by the second base station, and wherein the second base station is a home evolved NodeB (HeNB).

9. The method of claim 1, wherein the method is performed by the first base station, and wherein the first base station is an evolved NodeB (eNodeB).

10. The method of claim 1, wherein the method is performed by the UE.

11. The method of claim 1, wherein the Q factor is further based on the distance between the first base station and the second base station.

12. The method of claim 11, wherein the first base station is an eNode B and the second base station is an HeNB, and wherein the Q factor is further based on a transmit power of the eNode B.

13. The method of claim 1, wherein determining the Q factor further comprises selecting the Q factor from a lookup table.

14. The method of claim 13, wherein the lookup table is stored on an evolved NodeB (eNodeB).

15. The method of claim 1, wherein the Q factor is further based on the interference tolerance of the UE.

16. The method of claim 1, wherein the UE has an established connection with the first base station, and wherein the UE switches to a connection with the second base station based on the determined Q factor.

17. A home evolved NodeB (HeNB) for base station reselection in a wireless communications system, the HeNB comprising:
a processor;
memory in electronic communication with the processor;
instructions stored in the memory, the instructions being executable to:
determine a first indication of signal strength for a first signal sent from the HeNB and received by a user equipment (UE);
determine a second indication of signal strength for a second signal sent from a base station and received by the UE;
determine a relative signal strength based on the first indication of signal strength and the second indication of signal strength; and
determine a Q factor based on the relative signal strength and a location of a preset HeNB reselection distance, and an HeNB transmit power, wherein each Q factor corresponds to an HeNB, and wherein the Q factor is an indication of when base station reselection should be performed.

18. The HeNB of claim 17, wherein the instructions are further executable to send the Q factor to the UE.

19. The HeNB of claim 18, wherein the Q factor is further based on the interference tolerance of the UE.

20. The HeNB of claim 18, wherein sending the Q factor to the UE comprises sending the Q factor to the UE at the time of subscription.

21. The HeNB of claim 18, wherein sending the Q factor to the UE comprises sending the Q factor over the broadcast channel.

22. The HeNB of claim 18, wherein sending the Q factor to the UE comprises sending the proper entry for a preset lookup table on the UE.

23. The HeNB of claim 17, wherein the base station is an evolved NodeB (eNodeB).

24. The HeNB of claim 23, wherein the UE has an established connection with the base station, and wherein the UE switches to a connection with the HeNB based on the determined Q factor.

25. The HeNB of claim 17, wherein the Q factor is further based on the distance between the base station and the HeNB.

26. The HeNB of claim 25, wherein the first base station is an eNode B, and wherein the Q factor is further based on a transmit power of the eNode B.

27. The HeNB of claim 17, wherein determining the Q factor further comprises selecting a Q factor from a lookup table.

28. A user equipment (UE) for base station reselection in a wireless communications system, the UE comprising:
a processor;
memory in electronic communication with the processor;
instructions stored in the memory, the instructions being executable to:
determine a first indication of signal strength for a first signal sent from a first base station and received by the UE;
determine a second indication of signal strength for a second signal sent from a second base station and received by the UE, wherein at least one of the first base station and the second base station is a home evolved NodeB (HeNB);
determine a relative signal strength based on the first indication of signal strength and the second indication of signal strength; and
determine a Q factor based on the relative signal strength and a location of a preset HeNB reselection distance, and an HeNB transmit power, wherein each Q factor corresponds to an HeNB, and wherein the Q factor is an indication of when base station reselection should be performed.

29. The UE of claim 28, wherein determining the Q factor comprises receiving the Q factor from an evolved NodeB (eNodeB).

30. The UE of claim 28, wherein determining the Q factor comprises receiving the Q factor from a home evolved NodeB (HeNB).

31. The UE of claim 28, wherein the first base station is an evolved NodeB (eNodeB).

32. The UE of claim 28, wherein the second base station is a home evolved NodeB (HeNB).

33. The UE of claim 32, wherein the UE has an established connection with the first base station, and wherein the UE switches to a connection with the HeNB based on the second indication of signal strength and a HeNB received signal strength indicator (RSSI) threshold.

34. The UE of claim 32, wherein the UE has an established connection with the first base station, and wherein the UE switches to a connection with the HeNB based on the second indication of signal strength and an HeNB reference signal received power (RSRP) threshold.

35. The UE of claim 28, wherein determining the Q factor further comprises selecting a Q factor from a lookup table.

36. The UE of claim 28, wherein the Q factor is also based on the interference tolerance of the UE.

37. The UE of claim 28, wherein the UE has an established connection with the first base station, and wherein the UE switches to a connection with the second base station based on the determined Q factor.

38. The UE of claim 28, wherein the instructions are further executable to receive the Q factor from the second base station at the time of subscription.

39. The UE of claim 28, wherein the instructions are further executable to receive the Q factor from the second base station over a broadcast channel.

40. The UE of claim 28, wherein the instructions are further executable to receive the Q factor from the second base station by receiving the proper entry for a lookup table.

41. The user equipment (UE) of claim 28, wherein the Q factor is further based on a separation distance between the first base station and the second base station and an HeNB transmit power.

42. The user equipment (UE) of claim 41, wherein the first base station is an eNode B and the second base station is an HeNB, and wherein the Q factor is further based on a transmit power of the eNode B.

* * * * *